US012454983B2

(12) United States Patent
Iino et al.

(10) Patent No.: US 12,454,983 B2
(45) Date of Patent: Oct. 28, 2025

(54) ROLLING BEARING, ROTATING DEVICE, AND METHOD FOR MANUFACTURING ROLLING BEARING

(71) Applicant: Seiko Instruments Inc., Chiba (JP)

(72) Inventors: Akihiro Iino, Chiba (JP); Takayuki Kosaka, Chiba (JP); Haruhiko Hasegawa, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 41 days.

(21) Appl. No.: 18/405,614

(22) Filed: Jan. 5, 2024

(65) Prior Publication Data

US 2024/0240670 A1  Jul. 18, 2024

(30) Foreign Application Priority Data

Jan. 12, 2023 (JP) .................................. 2023-003037
Nov. 21, 2023 (JP) .................................. 2023-197512

(51) Int. Cl.
*F16C 19/06* (2006.01)
*F16C 33/58* (2006.01)
*F16C 35/077* (2006.01)

(52) U.S. Cl.
CPC ............ *F16C 35/077* (2013.01); *F16C 19/06* (2013.01); *F16C 33/586* (2013.01); *F16C 2208/02* (2013.01); *F16C 2208/52* (2013.01); *F16C 2208/70* (2013.01)

(58) Field of Classification Search
CPC ...... F16C 19/06; F16C 33/586; F16C 35/077; F16C 43/04; F16C 2208/02; F16C 2208/52; F16C 2208/70
See application file for complete search history.

(56) References Cited

U.S. PATENT DOCUMENTS 4,997,293 A * 3/1991 Ono ...................... F16C 35/077
384/476
5,375,933 A * 12/1994 Mizutani ................. F16C 33/62
384/492

FOREIGN PATENT DOCUMENTS

JP  H07103242 A  * 4/1995
JP  2001-099176     4/2001
JP  2019-206980    12/2019

* cited by examiner

*Primary Examiner* — Phillip A Johnson
(74) *Attorney, Agent, or Firm* — Crowell & Moring LLP

(57) ABSTRACT

The rolling bearing includes an inner ring and an outer ring that are disposed coaxially with each other, a rolling body that is disposed between the inner ring and the outer ring, and a resin cover that is mounted on the outer ring. The outer ring has an outer circumferential surface that faces an opposite side of the inner ring, and an end surface that faces an axial direction. The resin cover has a circumferential wall portion that covers the outer circumferential surface, and a flange portion that is connected to the circumferential wall portion and covers the end surface. The flange portion has an opening portion formation region that has a constant width in a radial direction, extends over an entire circumference, and is formed with opening portions that expose the end surface.

11 Claims, 9 Drawing Sheets

ROLLING BEARING, ROTATING DEVICE, AND METHOD FOR MANUFACTURING ROLLING BEARING

RELATED APPLICATIONS

This application claims priority to Japanese Patent application Nos. JP2023-003037 filed on Jan. 12, 2023 and JP2023-197512 filed on Nov. 21, 2023, the entire contents of which are incorporated herein by reference.

BACKGROUND OF THE INVENTION

1. Field of the Invention

The present invention relates to a rolling bearing, a rotating device, and a method for manufacturing a rolling bearing.

2. Description of the Related Art

As a rolling bearing, for example, a rolling bearing is known in which an outer circumferential surface of an outer ring is covered with an insulating film using an electrically insulating resin or the like, in order to prevent electrolytic corrosion that occurs in an environment in which the rolling bearing is used (for example, see PTL 1 and PTL 2). When the rolling bearing is mounted on a motor or the like, it is necessary to cover an end surface of the outer ring with an insulating film in order to prevent the end surface of the outer ring from coming into contact with a metal component.

The insulating film can be formed by embedding the outer ring in a resin by insert molding. In this method, the outer ring is positioned in a mold in a radial direction and in an axial direction, and then a resin is poured into the mold. The outer ring is positioned in the radial direction by inserting a positioning member such as a core pin inside the outer ring. The outer ring is positioned in the axial direction by abutting an ejector sleeve against the end surface of the outer ring. Here, since it is necessary to cover the end surface of the outer ring with an insulating film, for example, the ejector sleeve is configured to be in contact with an inner circumferential portion of the end surface of the outer ring, so that most of the end surface of the outer ring can be covered with the insulating film integrated with a portion covering the outer circumferential surface of the outer ring.

Instead of the outer ring, an inner circumferential surface and an end surface of an inner ring may be covered with an insulating film. In this case, the insulating film can be formed by insert molding as in the case of the outer ring.

3. Citations

PATENT LITERATURE

PTL 1: JP2019-206980A
PTL 2: JP2001-99176A

SUMMARY OF THE INVENTION

Since a width of the end surface of the outer ring in the radial direction is small in a small bearing, it is necessary to reduce an outer diameter of the ejector sleeve in order to ensure an area of a portion of the end surface of the outer ring covered with the insulating film. However, since the outer ring may be displaced in the radial direction due to a gap between the outer ring and the positioning member, if a difference between the outer diameter of the ejector sleeve and an inner diameter of the end surface of the outer ring is small, when the outer ring is displaced in the radial direction from a desired position with respect to the mold, the ejector sleeve may not come into contact with the outer ring in a partial region in a circumferential direction. In this case, the outer ring is not positioned in a desired posture in the mold, and accuracy of a molded product may decrease.

Therefore, the invention provides a rolling bearing in which a resin cover for preventing electrolytic corrosion is accurately attached to a bearing ring, a rotating device including the rolling bearing, and a method for manufacturing a rolling bearing in which a resin cover can be accurately attached to a bearing ring to prevent electrolytic corrosion.

A rolling bearing according to a first aspect of the invention includes: an inner ring and an outer ring that are disposed coaxially with each other; a rolling body that is disposed between the inner ring and the outer ring; and a resin cover that is mounted on one bearing ring of the inner ring and the outer ring, in which the one bearing ring has a circumferential surface that faces an opposite side of the other bearing ring of the inner ring and the outer ring, and an end surface that faces an axial direction, the resin cover has a circumferential wall portion that covers the circumferential surface, and a flange portion that is connected to the circumferential wall portion and covers the end surface, and the flange portion has an opening portion formation region that has a constant width in a radial direction, extends over an entire circumference, and is formed with opening portions that expose the end surface.

According to the first aspect, when the resin cover is insert-molded integrally with the one bearing ring, a part of a mold can be abutted against a location of the end surface of the one bearing ring exposed by the opening portion. Therefore, in order to allow the one bearing ring to be displaced in the radial direction from a desired position in the mold, the one bearing ring can be positioned in a desired posture in the mold by abutting a part of the mold against the end surface of the one bearing ring without ensuring a sufficient space for the mold to be in contact with a periphery of a location of the end surface of the one bearing ring that is covered with the flange portion. Accordingly, the resin cover for preventing electrolytic corrosion can be accurately attached to the one bearing ring.

In addition, resins are disposed on both sides of the opening portion in a circumferential direction in the opening portion formation region. Therefore, although a covering area of the end surface of the one bearing ring is reduced by the flange portion due to the formation of the opening portion, the flange portion can cover the end surface of the one bearing ring over a wide range in the radial direction. Accordingly, insulation performance by the flange portion can be ensured.

Since it is not necessary to ensure a sufficient space for the mold to be in contact with the periphery of the location of the end surface of the one bearing ring that is covered with the flange portion, the flange portion can be disposed in a wide range in the radial direction. Therefore, insulation of the one bearing ring from another component facing the end surface of the one bearing ring can be ensured by the flange portion, and contact between the flange portion and another component can be stabilized.

The rolling bearing according to a second aspect of the invention may be configured such that in the rolling bearing according to the first aspect, the flange portion further includes a covering region that is adjacent to the opening portion formation region in the radial direction, extends over an entire circumference, and entirely covers the end surface.

According to the second aspect, portions of the flange portion located on both sides of the opening portion in the circumferential direction are connected by the covering region of the flange portion. Therefore, strength of the opening portion formation region of the flange portion can be ensured. Mechanical strength and strength against friction can be ensured for contact between the flange portion and another component.

The rolling bearing according to a third aspect of the invention may be configured such that in the rolling bearing according to the first or second aspect, a total area of the opening portions is smaller than half an area of the opening portion formation region.

According to the third aspect, the strength of the opening portion formation region of the flange portion can be ensured. The mechanical strength and the strength against friction can be ensured for contact between the flange portion and another component.

The rolling bearing according to a fourth aspect of the invention may be configured such that in the rolling bearing according to any one of the first to third aspects, the opening portion is opened at a circumferential edge in the flange portion on an opposite side of the circumferential wall portion.

According to the fourth aspect, in injection molding (insert molding), it is not necessary to pour a resin, which flows from a cavity corresponding to the circumferential wall portion in the mold to a cavity corresponding to the flange portion, into a narrow cavity on an opposite side of the circumferential wall portion with respect to the opening portion. Therefore, the resin cover can be easily molded.

The rolling bearing according to a fifth aspect of the invention may be configured such that in the rolling bearing according to the second aspect, the covering region is adjacent to the opening portion formation region on an opposite side of the circumferential wall portion in the radial direction.

According to the fifth aspect, the portions of the flange portion located on both the sides of the opening portion in the circumferential direction are connected to both the covering region and the circumferential wall portion. Therefore, the strength of the opening portion formation region of the flange portion can be further improved.

The rolling bearing according to a sixth aspect of the invention may be configured such that in the rolling bearing according to any one of the first to fifth aspects, the flange portion has a gap over an entire circumference with respect to a circumferential edge of the end surface on an opposite side of the circumferential surface when viewed in the axial direction.

According to the sixth aspect, in injection molding (insert molding), it is possible to prevent a resin from flowing from the cavity corresponding to the flange portion across a circumferential edge of the end surface of the one bearing ring to an opposite side of the cavity corresponding to the circumferential wall portion in the radial direction. Therefore, it is possible to reduce occurrence of molding defects in a manufacturing process of the resin cover, and to reduce manufacturing cost of the rolling bearing.

The rolling bearing according to a seventh aspect of the invention may be configured such that in the rolling bearing according to any one of the first to sixth aspects, the opening portions are arranged at equal intervals in a circumferential direction.

According to the seventh aspect, it is possible to reduce occurrence of deviation of a center of gravity of the rolling bearing due to the provision of the opening portion in the resin cover.

The rolling bearing according to an eighth aspect of the invention may be configured such that in the rolling bearing according to any one of the first to seventh aspects, the flange portion includes a first flange portion covering a first end surface of the one bearing ring, and a second flange portion covering a second end surface of the one bearing ring, in which the first flange portion and the second flange portion are formed in the same shape as each other when viewed in the axial direction.

According to the eighth aspect, an appearance of the rolling bearing is substantially symmetrical on a front and back. Accordingly, it is possible to save trouble of identifying the front and back of the rolling bearing to mount the rolling bearing on a device.

The rolling bearing according to a ninth aspect of the invention may be configured such that in the rolling bearing according to any one of the first to eighth aspects, the one bearing ring is mounted on a mounted member, and the opening portions are fitted into the mounted member in a relatively unrotatable manner.

According to the ninth aspect, the one bearing ring can be restricted from rotating with respect to the mounted member. Further, since a fitting structure with the mounted member is provided in the resin cover, compared with a case where a fitting structure with the mounted member is provided in a bearing ring made of metal, workability of the one bearing ring is improved, and a decrease in circularity of the one bearing ring due to formation of the one bearing ring into a complicated shape can be prevented. Therefore, it is possible to prevent occurrence of creep while reducing a decrease in accuracy of the rolling bearing.

A rotating device according to a tenth aspect of the invention includes: a rotating body disposed to be rotatable; a support body configured to rotatably support the rotating body; and the rolling bearing according to any one of the first to ninth aspects interposed between the rotating body and the support body.

According to the tenth aspect, since the rolling bearing to which the resin cover for preventing electrolytic corrosion is attached is provided, it is possible to reduce an increase in rotational resistance of the rolling bearing due to the electrolytic corrosion. Therefore, a long life of the rotating device can be achieved.

A method for manufacturing a rolling bearing according to an eleventh aspect of the invention is a method for manufacturing a rolling bearing in which a resin cover to be mounted on a bearing ring of the rolling bearing and configured to cover a circumferential surface and an end surface of the bearing ring is insert-molded integrally with the bearing ring. The method for manufacturing a rolling bearing includes: embedding the bearing ring in the resin cover using a mold, the mold including a core that holds the bearing ring alone, and an ejector sleeve having a plurality of pin portions abutted against the end surface in a circumferential direction.

According to the eleventh aspect, the resin cover can be insert-molded integrally with the bearing ring in a state where the pin portions abut against the bearing ring. Therefore, even when the bearing ring is displaced in the radial direction from a desired position in the mold and a space for bringing the ejector sleeve into contact with an inner circumferential portion or an outer circumferential portion of the end surface of the bearing ring cannot be sufficiently ensured, the bearing ring can be positioned in a desired posture in the mold by abutting the pin portions against the end surface of the bearing ring. Accordingly, the resin cover for preventing electrolytic corrosion can be accurately attached to the bearing ring.

In addition, since cavities are formed on both sides of the pin portion of the mold in the circumferential direction, a resin is disposed in a location of the resin cover corresponding to the cavities. Therefore, although a covering area of the end surface of the bearing ring by the resin cover is reduced due to the provision of the pin portions in the ejector sleeve, the end surface of the bearing ring can be covered over a wide range in the radial direction by the resin cover. Accordingly, insulation performance by the resin cover can be ensured.

Since it is not necessary to sufficiently ensure a space for the ejector sleeve to be in contact with the inner circumferential portion or the outer circumferential portion of the end surface of the bearing ring, a portion of the resin cover covering the end surface of the bearing ring can be disposed in a wide range in the radial direction. Therefore, insulation of the bearing ring from another component facing the end surface of the bearing ring can be ensured by the resin cover, and contact between the resin cover and another component can be stabilized.

Further, since the core holds the bearing ring alone, the bearing ring on which the resin cover is mounted can be stabilized in the mold, unlike a case where the core holds the assembled rolling bearing. Therefore, the resin cover can be accurately attached to the bearing ring.

According to the invention, the resin cover for preventing electrolytic corrosion can be accurately attached to the bearing ring.

DETAILED DESCRIPTION OF THE PREFERRED EMBODIMENTS

Hereinafter, embodiments of the invention will be described with reference to the drawings. In the following description, configurations having the same or similar functions are denoted by the same reference signs. A duplicate description of these configurations may be omitted.

Figure 1:
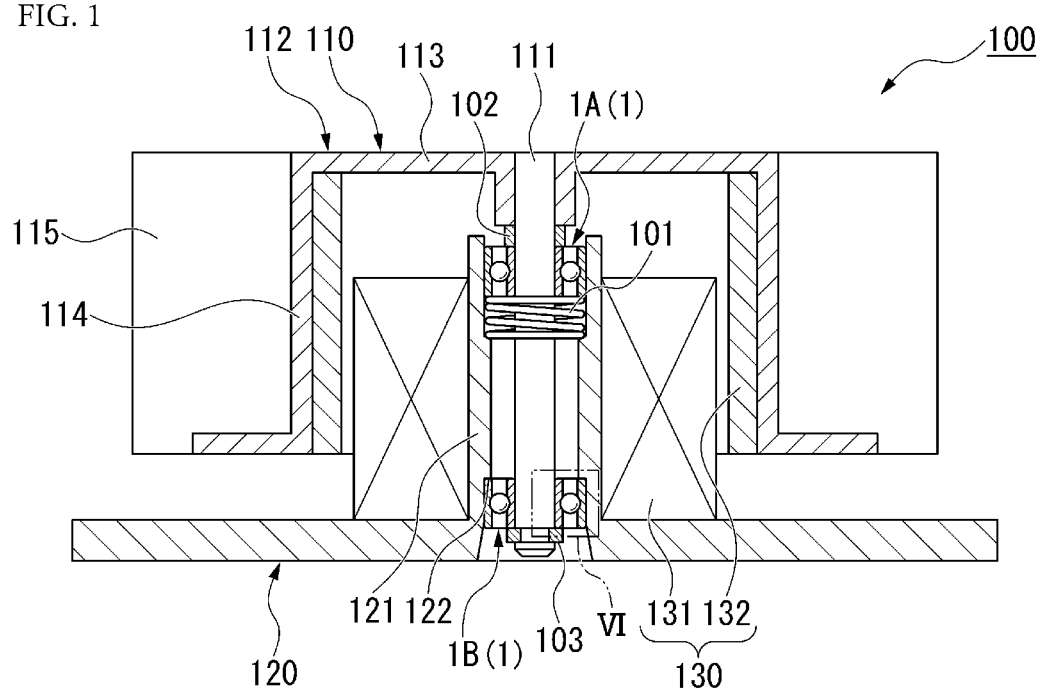
FIG. 1 is a longitudinal cross-sectional view showing a fan motor according to an embodiment.

FIG. 1 is a longitudinal cross-sectional view showing a fan motor according to an embodiment.

A fan motor 100 shown in FIG. 1 is an example of a rotating device. The fan motor 100 includes a rotating body 110 having a shaft portion 111, a base portion 120 supporting the rotating body 110, a drive unit 130 configured to rotate the rotating body 110 with respect to the base portion 120, and a pair of rolling bearings 1 mounted on the base portion 120 and rotatably supporting the shaft portion 111. In the following description, the rolling bearing 1 may be simply referred to as the bearing 1. In the present embodiment, a direction in which a central axis O of the shaft portion 111 of the rotating body 110 extends is referred to as an axial direction, a direction orthogonal to the central axis O and extending radially from the central axis O is referred to as a first radial direction, and a direction of circumference around the central axis O is referred to as a first circumferential direction. Of directions parallel to the axial direction and oriented in opposite directions, one is defined as an upward direction, and the other is defined as a downward direction.

The base portion 120 includes a tubular portion 121 extending in the axial direction. The shaft portion 111 of the rotating body 110 is inserted into the tubular portion 121.

The rotating body 110 is disposed at an upper part of the base portion 120. The rotating body 110 includes the shaft portion 111 and a fan 112 connected to the shaft portion 111 outside the tubular portion 121. The fan 112 is fixed to an upper end portion of the shaft portion 111. The fan 112 includes a flange 113 protruding outward in the first radial direction from the upper end portion of the shaft portion 111 and extending over the entire first circumferential direction, a circumferential wall 114 extending downward from an entire outer circumferential edge of the flange 113, and a plurality of blades 115 arranged at intervals in the first circumferential direction on an outer side of the circumferential wall 114 in the first radial direction. The circumferential wall 114 surrounds the tubular portion 121 over an entire circumference thereof while being spaced apart from the tubular portion 121 in the first radial direction.

The drive unit 130 is a motor. The drive unit 130 includes a stator 131 having a coil and a rotor 132 having a magnet. The stator 131 is fixed to the base portion 120 outside the shaft portion 111. The rotor 132 is fixed to the circumferential wall 114 of the fan 112 on an outer side of the stator 131 in the first radial direction.

Each of the pair of bearings 1 is interposed between an inner circumferential surface of the tubular portion 121 and an outer circumferential surface of the shaft portion 111. Each bearing 1 is a ball bearing. The pair of bearings 1 are disposed coaxially with each other. The pair of bearings 1 are disposed at an interval in the axial direction.

The pair of bearings 1 is a first bearing 1A and a second bearing 1B. The first bearing 1A is inserted into the tubular portion 121 from a rotating body 110 side. The first bearing 1A is in contact with a biasing member 101 and a collar 102. The biasing member 101 is a coil spring. The biasing member 101 is disposed on an opposite side of the rotating body 110 across the first bearing 1A. The biasing member 101 is externally fitted to the shaft portion 111 of the rotating body 110, and is disposed coaxially with the central axis O. The biasing member 101 is disposed inside the tubular portion 121 in a compressed state. The biasing member 101 is compressed in contact with an outer ring 20 (see FIG. 2) of the first bearing 1A. Accordingly, the biasing member 101 biases the first bearing 1A toward the rotating body 110 side with respect to the tubular portion 121. The collar 102 is disposed on an opposite side of the biasing member 101 across the first bearing 1A. The collar 102 is interposed between an inner ring 10 of the first bearing 1A and the flange 113 of the fan 112.

The second bearing 1B is inserted into the tubular portion 121 from the opposite side of the rotating body 110. The outer ring 20 of the second bearing 1B is restricted from being displaced toward the rotating body 110 side by a stepped surface 122 in an inner circumferential surface of the tubular portion 121. The inner ring 10 (see FIG. 2) of the second bearing 1B is in contact with a C-ring 103 mounted on the shaft portion 111, and is restricted from being displaced in a direction away from the rotating body 110 with respect to the shaft portion 111.

First Embodiment

Figure 2:
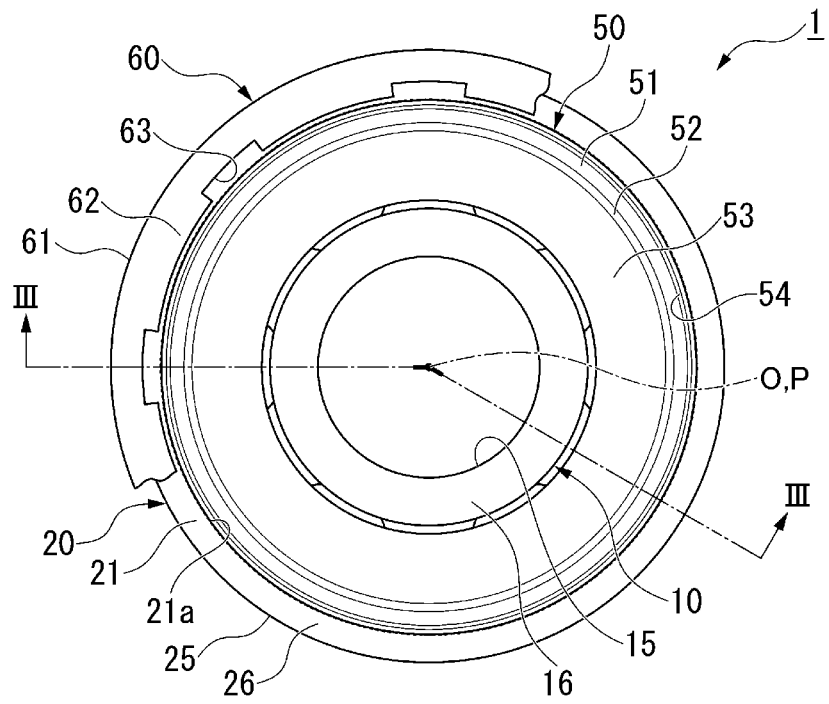
FIG. 2 is a plan view of a rolling bearing according to a first embodiment.
Figure 3:
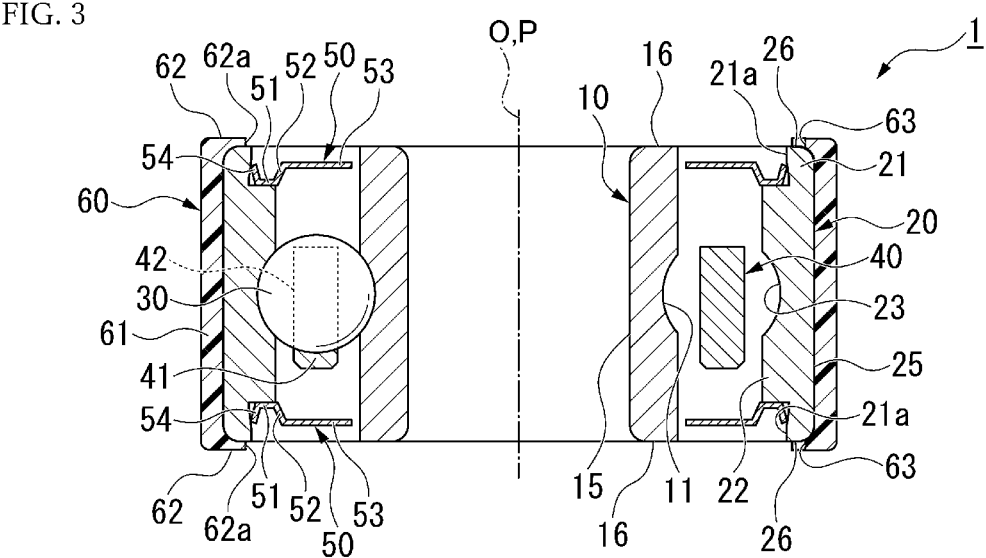
FIG. 3 is a longitudinal cross-sectional view of the rolling bearing according to the first embodiment.

FIG. 2 is a plan view of a rolling bearing according to a first embodiment. FIG. 3 is a longitudinal cross-sectional view of the rolling bearing according to the first embodiment, showing a section taken along line III-III in FIG. 2. In FIG. 2, a part of a resin cover 60, which will be described later, is cut away.

As shown in FIGS. 1 to 3, the pair of bearings 1 has the same configuration. Each bearing 1 includes the inner ring 10 and the outer ring 20 which are bearing rings, a plurality of rolling bodies 30, a cage 40, a pair of seal members 50, and the resin cover 60. The inner ring 10 and the outer ring 20 share the central axis O as a common axis.

The inner ring 10 is provided as a rotating ring. The inner ring 10 is externally fitted to the shaft portion 111. The outer ring 20 is provided as a fixed ring. The outer ring 20 surrounds the inner ring 10 from an outside in the first radial direction in a state where an annular space is provided between the outer ring 20 and the inner ring 10. The plurality of rolling bodies 30 are disposed between the inner ring 10 and the outer ring 20, and are held by the cage 40 so as to be capable of rolling. The cage 40 rotatably holds the rolling bodies 30 in a state where the plurality of rolling bodies 30 are arranged evenly in the first circumferential direction. The seal member 50 covers an annular space between the inner ring 10 and the outer ring 20 from an outside in the axial direction.

The outer ring 20 is made of a metal material such as stainless steel or bearing steel and has an annular shape. The outer ring 20 includes an outer ring body 21 having a width along the axial direction equal to a width of the inner ring 10 along the axial direction, and a protruding portion 22 protruding inward in the first radial direction from the outer ring body 21 and extending over the entire first circumferential direction. The outer ring body 21 has an inner circumferential surface 21a extending inward in the axial direction from an opening edge of the outer ring 20. The protruding portion 22 is formed in a portion of the outer ring body 21 located at a center in the axial direction. A width of the protruding portion 22 in the axial direction is smaller than the width of the outer ring body 21 in the axial direction and larger than an outer diameter of the rolling body 30.

An outer ring raceway surface 23 recessed outward in the first radial direction is formed on an inner circumferential surface of the protruding portion 22. The outer ring raceway surface 23 is formed in a hemispherical shape in a cross-sectional view along an outer surface of the rolling body 30, and is formed in an annular shape extending in the first circumferential direction over an entire circumference of the inner circumferential surface of the protruding portion 22. The outer ring raceway surface 23 is formed in a portion of the inner circumferential surface of the protruding portion 22 located at the center in the axial direction. A portion of the inner circumferential surface of the protruding portion 22 excluding the outer ring raceway surface 23 extends in the axial direction with a constant inner diameter.

The outer ring 20 includes an outer circumferential surface 25 and a pair of end surfaces 26. The outer circumferential surface 25 faces an opposite side of the inner ring 10. The outer circumferential surface 25 coincides with an outer circumferential surface of the outer ring body 21. The end surface 26 faces outward in the axial direction. The end surface 26 coincides with an end surface of the outer ring body 21 facing outward in the axial direction. The end surface 26 has a constant width in the first radial direction and extends in the first circumferential direction. The end surface 26 is a portion extending from an outer circumferential edge of the outer ring 20 to an inner circumferential edge of the outer ring body 21 when viewed in the axial direction. In the shown example, an end portion of the outer ring 20 in the axial direction is chamfered, and the chamfered portion is in the end surface 26.

The inner ring 10 is made of a metal material such as stainless steel or bearing steel and has an annular shape. An inner ring raceway surface 11 recessed inward in the first radial direction is formed on an outer circumferential surface of the inner ring 10. The inner ring raceway surface 11 is formed in a hemispherical shape in the cross-sectional view along the outer surface of the rolling body 30, and is formed in an annular shape extending in the first circumferential direction over an entire circumference of the outer circumferential surface. The inner ring raceway surface 11 is formed in a portion of the outer circumferential surface of the inner ring 10 located at a center in the axial direction, and faces the outer ring raceway surface 23 in the first radial direction. A portion of the outer circumferential surface of the inner ring 10 excluding the inner ring raceway surface 11 extends in the axial direction with a constant outer diameter.

The inner ring 10 includes an inner circumferential surface 15 and a pair of end surfaces 16. The inner circumferential surface 15 faces an opposite side of the outer ring 20. The end surface 16 faces outward in the axial direction. The end surface 16 has a constant width in the first radial direction and extends in the first circumferential direction. The end surface 16 is a portion extending from an inner circumferential edge to an outer circumferential edge of the inner ring 10 when viewed in the axial direction.

The plurality of rolling bodies 30 are made of a metal material such as stainless steel or bearing steel and have a spherical shape. The plurality of rolling bodies 30 are disposed between the outer ring raceway surface 23 and the inner ring raceway surface 11, and are supported by the outer ring raceway surface 23 and the inner ring raceway surface 11 so as to be capable of rolling. The plurality of rolling bodies 30 are maintained at intervals in the first circumferential direction by the cage 40.

As shown in FIG. 3, the cage 40 is formed of a synthetic resin or a metal material and has an annular shape as a whole. The cage 40 is disposed coaxially with the central axis O. The cage 40 includes an annular portion 41 formed in an annular shape and disposed below the plurality of rolling bodies 30, and a plurality of column portions 42 protruding upward from the annular portion 41 and provided at intervals in the first circumferential direction. The column portions 42 are arranged evenly in the first circumferential direction. A pair of column portions 42 adjacent to each other in the first circumferential direction form a ball pocket therebetween. The ball pocket penetrates through the cage 40 in the first radial direction, and opens upward at an upper end surface of the cage 40. The ball pockets are provided corresponding to the number of the rolling bodies 30, and hold the rolling bodies 30 such that the rolling bodies 30 can roll individually. Accordingly, the cage 40 arranges the rolling bodies 30 evenly at intervals in the first circumferential direction.

As shown in FIGS. 2 and 3, the seal member 50 is formed in a circular plate shape. The seal member 50 is disposed coaxially with the central axis O. The seal member 50 is mounted on the outer ring 20. The seal members 50 are disposed one by one on both sides in the axial direction with respect to the plurality of rolling bodies 30. The seal member 50 includes a pedestal portion 51 that overlaps the protruding portion 22 of the outer ring 20 from the outside in the axial direction, a step portion 52 that extends outward in the axial direction from an inner circumferential edge of the pedestal portion 51, a cover portion 53 that protrudes inward in the first radial direction from an end edge of the step portion 52 on the outside in the axial direction, and a locking portion 54 that extends outward in the first radial direction and outward in the axial direction from an outer circumferential edge of the pedestal portion 51. The seal member 50 extends in the first radial direction so as to straddle at least a center of the rolling body 30 in a plan view. An inner circumferential edge of the cover portion 53 is disposed at the outer circumferential surface of the inner ring 10 with a gap therebetween. An outer circumferential edge of the locking portion 54 is locked to the inner circumferential surface 21a of the outer ring body 21 from an inside in the axial direction. Accordingly, the seal member 50 is fixed to the outer ring 20.

Figure 4:
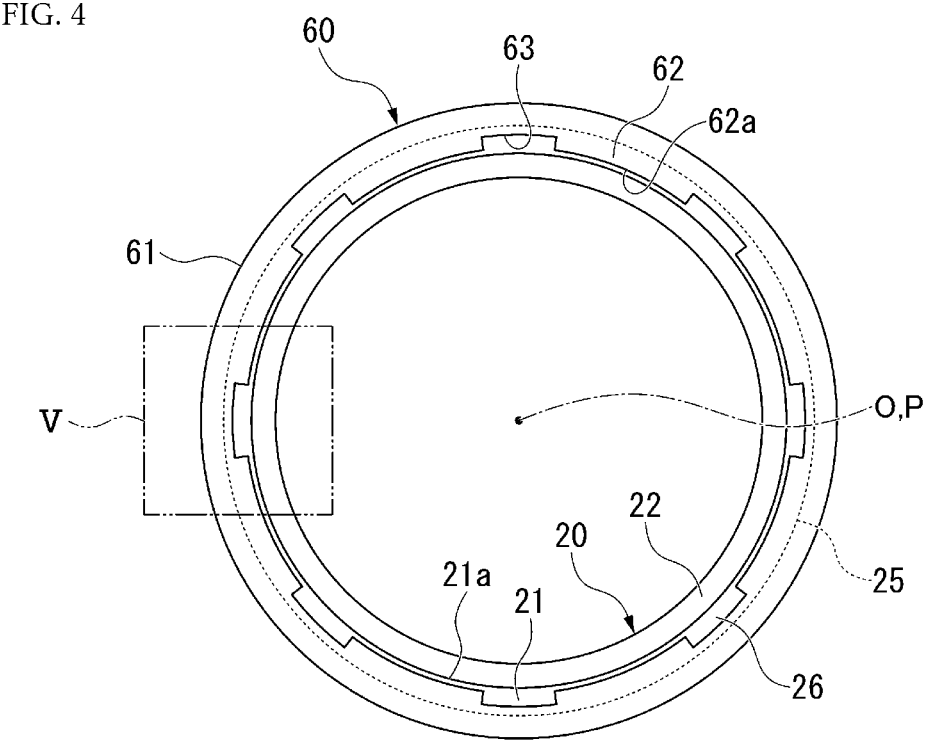
FIG. 4 is a plan view of an outer ring and a resin cover according to the first embodiment.

FIG. 4 is a plan view of the outer ring and the resin cover according to the first embodiment.

As shown in FIGS. 3 and 4, the resin cover 60 is mounted on the outer ring 20 so as not to be relatively displaceable. The resin cover 60 is made of an insulating resin material. A type of a resin used to form the resin cover 60 is preferably polybutylene terephthalate (PBT) or polyphenylene sulfide (PPS), which has low moisture absorption, easy molding accuracy, and excellent chemical resistance. It is preferable to add potassium titanate whisker to the resin as a reinforcing material. It is preferable to blend 5% to 40%, and more preferably 10% to 30% of the potassium titanate whisker. It is desirable not to add glass fiber or carbon fiber to the resin as the reinforcing material. This is because, when hard glass fiber or carbon fiber is added to the resin, it is difficult to perform processing when the resin cover after insert molding is subjected to finishing processing by machining such as centerless processing, and a grindstone or a cutting tool is easily damaged. Meanwhile, potassium titanate whisker is softer than glass fiber and carbon fiber, and is small in thickness and length and easy to machine. A resin to which potassium titanate whisker is added is easier to machine than the resin alone.

The resin cover 60 is formed in a cylindrical shape. The resin cover 60 includes a circumferential wall portion 61 covering the outer circumferential surface 25 of the outer ring 20 and a pair of flange portions 62 connected to the circumferential wall portion 61 and covering the end surface 26 of the outer ring 20. The circumferential wall portion 61 covers the entire outer circumferential surface 25 of the outer ring 20 from the outside in the first radial direction. The circumferential wall portion 61 extends in the axial direction with a constant outer diameter. The pair of flange portions 62 are formed in the same shape as each other when viewed in the axial direction. The flange portion 62 protrudes inward in the first radial direction from an end portion of the circumferential wall portion 61 in the axial direction. The flange portion 62 extends around the central axis O over an entire circumference. The flange portion 62 is a portion extending inward in the first radial direction from a position overlapping an outer circumferential edge of the end surface 26 of the outer ring 20 when viewed in the axial direction. That is, the circumferential wall portion 61 protrudes outward in the axial direction from the outer ring 20 and is connected to an outer circumferential edge of the flange portion 62.

An inner circumferential edge 62a of the flange portion 62 has a circular shape centered on an axis P extending in the axial direction. In the following description, a direction orthogonal to the axis P and radially extending from the axis P is referred to as a second radial direction, and a direction around the axis P is referred to as a second circumferential direction. In the present embodiment, the axis P coincides with the central axis O. Therefore, the second radial direction coincides with the first radial direction, and the second circumferential direction coincides with the first circumferential direction. An inner diameter of the flange portion 62 is larger than an inner diameter of the end surface 26 of the outer ring 20. Accordingly, the inner circumferential edge 62a of the flange portion 62 is located further outward in the first radial direction than an inner circumferential edge of the end surface 26 of the outer ring 20, and has a gap over an entire circumference with respect to the inner circumferential edge of the end surface 26 of the outer ring 20. The axis P may be further displaced in the first radial direction with respect to the central axis O due to a positional displacement or the like at the time of manufacturing to be described later. In this case, a part of the inner circumferential edge 62a of the flange portion 62 may be in contact with the inner circumferential edge of the end surface 26 of the outer ring 20 when viewed in the axial direction.

Opening portions 63 are formed in the flange portion 62. A plurality of (eight in the shown example) opening portions 63 are provided at equal intervals in the second circumferential direction. All the opening portions 63 are formed in the same shape. The shape of the opening portion 63 as viewed in the axial direction has a constant width in the second radial direction and extends in the second circumferential direction. The shape of the opening portion 63 is not particularly limited. The opening portion 63 penetrates the flange portion 62 in the axial direction to expose the end surface 26 of the outer ring 20. The opening portion 63 opens to the inner circumferential edge 62a of the flange portion 62 and is open to an inner side in the second radial direction. The entire opening portion 63 is located inside the outer circumferential edge of the flange portion 62. A length of the opening portion 63 in the second circumferential direction is smaller than an interval between the adjacent opening portions 63 in the second circumferential direction.

Figure 5:
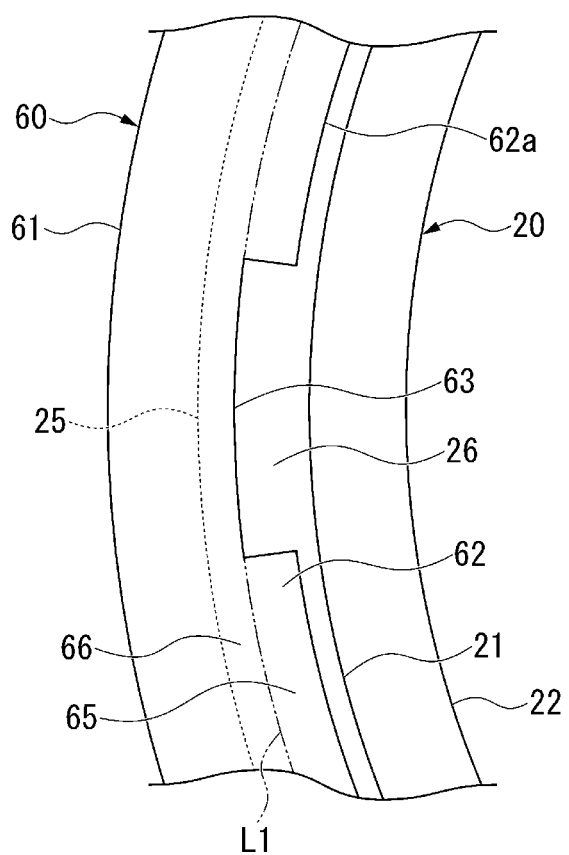
FIG. 5 is an enlarged view of a portion V in FIG. 4.

FIG. 5 is an enlarged view of a portion V in FIG. 4.

As shown in FIG. 5, the flange portion 62 has an opening portion formation region 65 in which all the opening portions 63 are formed. The opening portion formation region 65 has a constant width in the second radial direction, extends over an entire circumference in the second circumferential direction, and is an annular region centered on the axis P when viewed in the axial direction. The opening portion formation region 65 includes all the opening portions 63 and is defined by a range in which at least one opening portion 63 is inscribed. Therefore, in the present embodiment, an outer circumferential edge of the opening portion formation region 65 is in contact with all the opening portions 63 from an outer side in the second radial direction, and an inner circumferential edge of the opening portion formation region 65 coincides with the inner circumferential edge 62a of the flange portion 62. That is, the opening portion formation region 65 is an annular region sandwiched between a circular arc-shaped imaginary line L1 and the inner circumferential edge 62a of the flange portion 62 shown in FIG. 5. A total area of the opening portions 63 is smaller than half an area of the opening portion formation region 65.

The flange portion 62 has a covering region 66 adjacent to the opening portion formation region 65 in the second radial direction. The covering region 66 extends over an entire circumference in the second circumferential direction. The covering region 66 is located on a circumferential wall portion 61 side in the second radial direction (that is, the outer side in the second radial direction) of the opening portion formation region 65, and is adjacent to the opening portion formation region 65 over the entire circumference. The entire covering region 66 covers the end surface 26 of the outer ring 20. The covering region 66 is defined in a range that covers the end surface 26 of the outer ring 20. Therefore, an outer circumferential edge of the covering region 66 coincides with the outer circumferential edge of the end surface 26 of the outer ring 20 when viewed in the axial direction, and an inner circumferential edge of the covering region 66 coincides with the outer circumferential edge of the opening portion formation region 65. That is, the covering region 66 is an annular region sandwiched between the circular arc-shaped imaginary line L1 and the outer circumferential edge of the end surface 26 of the outer ring 20 shown in FIG. 5.

Figure 6:
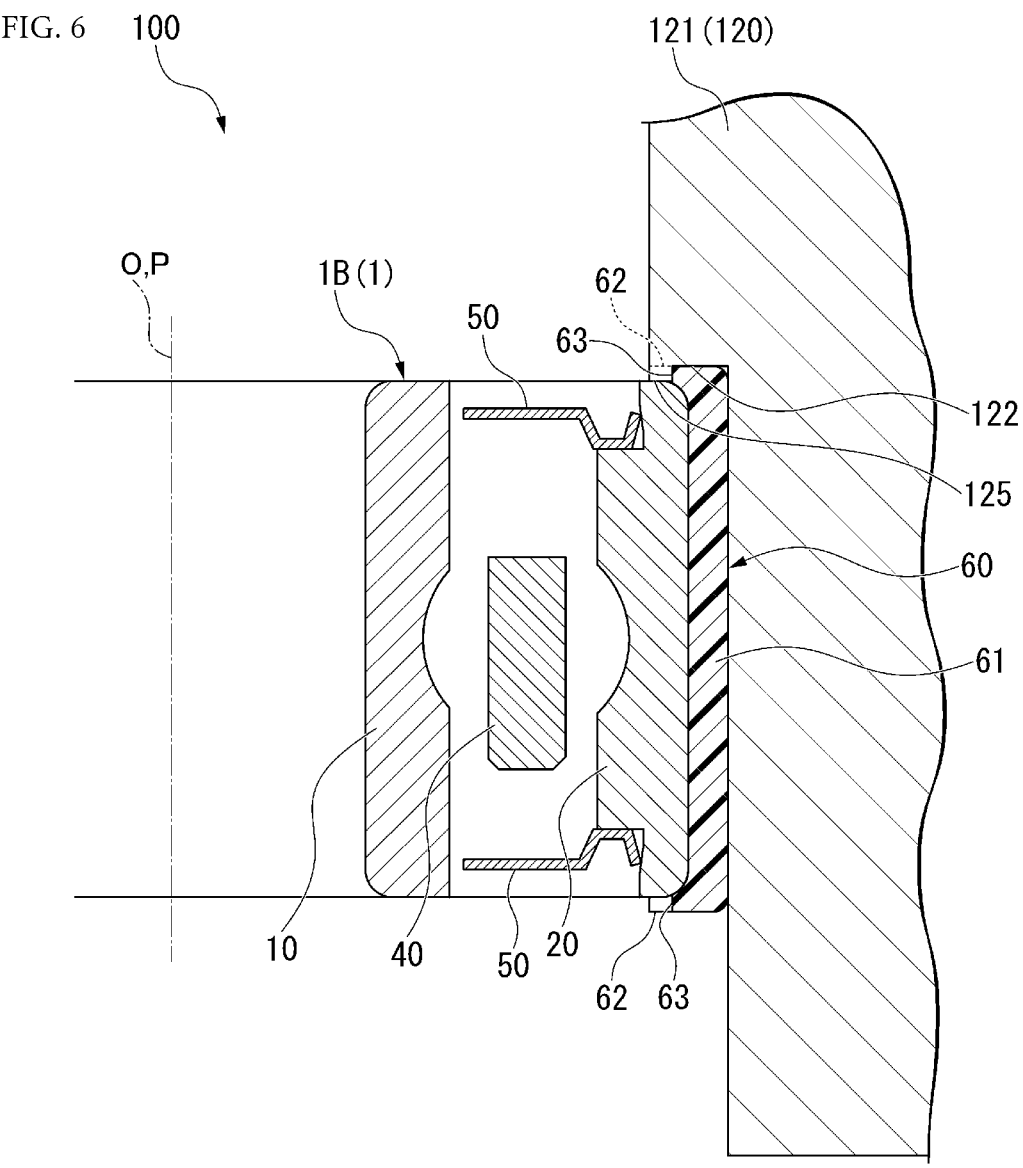
FIG. 6 is an enlarged view showing a portion VI in FIG. 1.

FIG. 6 is an enlarged view showing a portion VI in FIG. 1.

As shown in FIG. 6, the bearing 1 is disposed such that the opening portion 63 of the flange portion 62 is fitted into the base portion 120 of the fan motor 100 so as not to be relatively rotatable. In the base portion 120, projection portions 125 are formed on the stepped surface 122 in the inner circumferential surface of the tubular portion 121 as fitted portions that fit into the opening portions 63 of the flange portion 62 of the bearing 1. The projection portions 125 are inserted into the opening portions 63 in a one-to-one manner. The number of the projection portions 125 provided on the stepped surface 122 is equal to or less than the number of the opening portions 63. It is desirable that each of the projection portions 125 is formed so that there is substantially no gap in the first circumferential direction and the first radial direction with respect to the opening portion 63 into which the projection portion 125 is inserted.

The resin cover 60 is insert-molded integrally with the outer ring 20 alone. A mold 70 for insert-molding the resin cover 60 will be described in detail.

Figure 7:
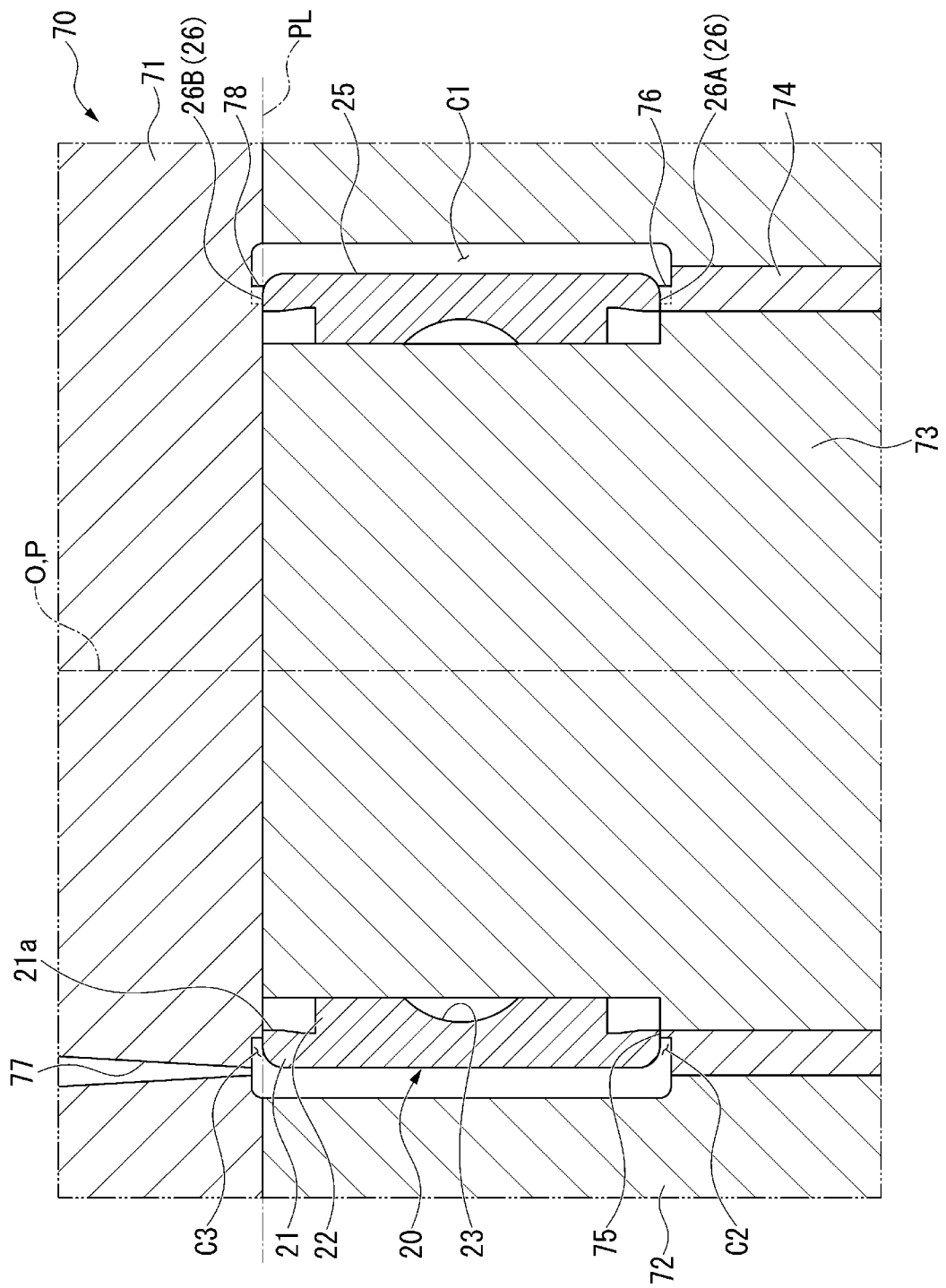
FIG. 7 is a diagram showing a method for manufacturing the rolling bearing according to the first embodiment.

FIG. 7 is a view showing a method for manufacturing the rolling bearing according to the first embodiment, and is a cross-sectional view showing a cross section including the outer ring and the axis P in the mold.

As shown in FIG. 7, the mold 70 includes a fixed-side cavity 71, a movable-side cavity 72, a core pin 73, and an ejector sleeve 74. In a state where the outer ring 20 is externally fitted to the core pin 73, the fixed-side cavity 71 is aligned with the core pin 73 and the movable-side cavity 72, and a cavity corresponding to the resin cover 60 is formed around the outer ring 20. Reference sign PL in the figure denotes a parting line.

The core pin 73 is formed in a columnar shape centered on the axis P. The core pin 73 is inserted into the outer ring 20 and supports an inner circumferential surface of the outer ring 20. In the present embodiment, the core pin 73 supports the inner circumferential surface of the protruding portion 22 of the outer ring 20. When the core pin 73 coaxially supports the outer ring 20, the central axis O and the axis P coincide with each other in a molded product. Meanwhile, when the core pin 73 supports the outer ring 20 in an eccentric state due to a difference between an outer diameter of the core pin 73 and an inner diameter of the outer ring 20, the central axis O and the axis P in the molded product are different from each other. The core pin 73 abuts against the fixed-side cavity 71.

The movable-side cavity 72 surrounds the core pin 73. The movable-side cavity 72 has a cavity C1 facing the outer circumferential surface 25 of the outer ring 20. The cavity C1 corresponds to the circumferential wall portion 61 of the resin cover 60. The movable-side cavity 72 abuts against the fixed-side cavity 71.

The ejector sleeve 74 is formed in a cylindrical shape centered on the axis P. The ejector sleeve 74 is externally fitted to the core pin 73 and interposed between the core pin 73 and the movable-side cavity 72. The ejector sleeve 74 includes an inner circumferential portion 75 and pin portions 76 that abut against a first end surface 26A of the outer ring 20, and a cavity C2 facing the first end surface 26A of the outer ring 20. The inner circumferential portion 75 extends in the second circumferential direction with a constant width when viewed in the axial direction. The inner circumferential portion 75 is in close contact with the first end surface 26A of the outer ring 20 over an entire circumference. The inner circumferential portion 75 forms the inner circumferential edge 62a of the flange portion 62. The plurality of pin portions 76 are provided in a circumferential direction. The pin portion 76 is connected to the inner circumferential portion 75. The pin portion 76 protrudes outward in the second radial direction from the inner circumferential portion 75. The pin portions 76 are provided at equal intervals in the second circumferential direction. The pin portion 76 abuts against the first end surface 26A of the outer ring 20. The pin portion 76 abuts against a location on an inner side in the first radial direction than an outer circumferential edge of the first end surface 26A of the outer ring 20. The pin portion 76 forms the opening portion 63 of the flange portion 62. Therefore, the pin portion 76 has a constant width in the second radial direction and extends in the second circumferential direction corresponding to the shape of the opening portion 63. A length of the pin portion 76 in the second circumferential direction is smaller than an interval between the adjacent pin portions 76 in the second circumferential direction. The cavity C2 corresponds to the flange portion 62 of the resin cover 60 facing the first end surface 26A of the outer ring 20. The cavity C2 is located on an outside of the inner circumferential portion 75 in the second radial direction and around the pin portion 76. The cavity C2 communicates with the cavity C1 of the movable-side cavity 72.

The fixed-side cavity 71 supports a second end surface 26B of the outer ring 20 on the parting line PL. The fixed-side cavity 71 has a cavity C3 facing the second end surface 26B of the outer ring 20, and a gate 77 communicating with the cavity C3. The cavity C3 corresponds to the flange portion 62 of the resin cover 60 facing the second end surface 26B of the outer ring 20. The cavity C3 communicates with the cavity C1 of the movable-side cavity 72. The fixed-side cavity 71 is in close contact with the second end surface 26B of the outer ring 20 over an entire circumference on an inner side of the cavity C3 in the second radial direction. The fixed-side cavity 71 has a fixed-side pin portion 78 that abuts against the second end surface 26B of the outer ring 20 and forms the opening portion 63 of the flange portion 62 in order to make the cavity C3 correspond to the flange portion 62.

As described above, in the bearing 1 of the present embodiment, the flange portion 62 of the resin cover 60 has the opening portion formation region 65 that has the constant width in the second radial direction, extends over the entire circumference, and is formed with the opening portions 63 that exposes the end surface 26 of the outer ring 20. The outer ring 20 is embedded in the resin cover 60 by insert molding using the mold 70 having the core pin 73 holding the outer ring 20 alone and the ejector sleeve 74 having the plurality of pin portions 76 abutted against the end surface 26 of the outer ring 20 in the circumferential direction. According to this configuration, when the resin cover 60 is insert-molded integrally with the outer ring 20, the pin portion 76 of the ejector sleeve 74 can abut against a location of the end surface 26 of the outer ring 20 that is exposed by the opening portions 63. Therefore, in order to allow the outer ring 20 to be displaced in the second radial direction from a desired position in the mold 70, the outer ring 20 can be positioned in a desired posture in the mold 70 by abutting the pin portion 76 of the ejector sleeve 74 against the end surface 26 of the outer ring 20 without ensuring a sufficient space for the ejector sleeve 74 to be in contact with a periphery of a location of the end surface 26 of the outer ring 20 that is covered with the flange portion 62 of the resin cover 60 (an inner circumferential portion of the end surface 26). Accordingly, the resin cover 60 for preventing electrolytic corrosion can be accurately attached to the outer ring 20.

In addition, since the cavities C2 are formed on both sides of the pin portion 76 of the mold 70 in the second circumferential direction, resins are disposed on both sides of the opening portion 63 in the opening portion formation region 65 in the second circumferential direction. Therefore, although a covering area of the end surface 26 of the outer ring 20 by the flange portion 62 is reduced due to the provision of the pin portion 76 in the ejector sleeve 74 and the formation of the opening portion 63, the flange portion 62 can cover the end surface 26 of the outer ring 20 over a wide range in the second radial direction. Accordingly, insulation performance by the flange portion 62 can be ensured.

Since it is not necessary to ensure a sufficient space for the ejector sleeve 74 to be in contact with the periphery of the location of the end surface 26 of the outer ring 20 that is covered with the flange portion 62 (the inner circumferential portion of the end surface 26), the flange portion 62 can be disposed in a wide range in the second radial direction. Therefore, insulation of the outer ring 20 from the biasing member 101 or the like facing the end surface 26 of the outer ring 20 can be ensured by the flange portion 62, and contact between the flange portion 62 and the biasing member 101 or the like can be stabilized.

Further, when the resin cover 60 is insert-molded integrally with the outer ring 20, the core pin 73 holds the outer ring 20 alone, so that the outer ring 20 on which the resin cover 60 is mounted can be stabilized in the mold 70, unlike a case where an assembled bearing is held by the core pin. Therefore, the resin cover 60 can be accurately attached to the outer ring 20.

The flange portion 62 further includes the covering region 66 that is adjacent to the opening portion formation region 65 in the second radial direction, extends over the entire circumference, and entirely covers the end surface 26 of the outer ring 20. According to this configuration, portions of the flange portion 62 located on both sides of the opening portion 63 in the second circumferential direction are connected by the covering region 66 of the flange portion 62. Therefore, strength of the opening portion formation region 65 of the flange portion 62 can be ensured. Mechanical strength and strength against friction can be ensured for contact between the flange portion 62 and the biasing member 101 or the like.

The total area of the opening portions 63 is smaller than half the area of the opening portion formation region 65. According to this configuration, the strength of the opening portion formation region 65 can be ensured. The mechanical strength and the strength against friction can be ensured for contact between the flange portion 62 and the biasing member 101 or the like.

The opening portion 63 opens at the inner circumferential edge 62a of the flange portion 62 on an opposite side of the circumferential wall portion 61. According to this configuration, in injection molding (insert molding), it is not necessary to pour a resin, which flows from the cavity C1 corresponding to the circumferential wall portion 61 in the mold 70 to the cavities C2 and C3 corresponding to the flange portions 62, into a narrow cavity on the opposite side of the circumferential wall portion 61 with respect to the opening portion 63. Therefore, the resin cover 60 can be easily molded.

The flange portion 62 has a gap over the entire circumference with respect to the inner circumferential edge of the end surface 26 of the outer ring 20 when viewed in the axial direction. According to this configuration, in injection molding (insert molding), it is possible to prevent a resin from flowing from the cavities C2 and C3 corresponding to the flange portions 62 across the inner circumferential edge of the end surface 26 of the outer ring 20 to an opposite side of the cavity C1 corresponding to the circumferential wall portion 61 in a radial direction (an inner side of the outer ring 20 in the radial direction). Therefore, it is possible to reduce occurrence of molding defects in a manufacturing process of the resin cover 60, and to reduce manufacturing cost of the bearing 1.

The opening portions 63 are arranged at equal intervals in the second circumferential direction. According to this configuration, it is possible to reduce occurrence of deviation of a center of gravity of the bearing 1 due to the provision of the opening portion 63 in the resin cover 60.

The pair of flange portions 62 are formed in the same shape as each other when viewed in the axial direction. According to this configuration, an appearance of the bearing 1 is substantially symmetrical on a front and back. Accordingly, it is possible to save effort of identifying the front and back of the bearing 1 to mount the bearing 1 on the base portion 120 of the fan motor 100.

According to the fan motor 100 in the present embodiment, since the bearing 1 to which the resin cover 60 for preventing electrolytic corrosion is attached is provided, it is possible to reduce an increase in rotational resistance of the bearing 1 due to the electrolytic corrosion. Therefore, a long life of the fan motor 100 can be achieved.

Further, the opening portion 63 of the resin cover 60 is fitted into the base portion 120 so as not to be relatively rotatable. According to this configuration, the outer ring 20 can be restricted from rotating with respect to the base portion 120. Further, since a fitting structure with the base portion 120 is provided in the resin cover 60, compared with a case where a fitting structure with the base portion 120 is provided in the outer ring 20 made of metal, workability of the outer ring 20 is improved, and a decrease in circularity of the outer ring 20 due to formation of the outer ring 20 into a complicated shape can be prevented. Therefore, it is possible to prevent occurrence of slippage of the outer ring 20 while reducing a decrease in accuracy of the bearing 1.

In the first embodiment, the flange portion 62 has the covering region 66, but the flange portion may not have the covering region. In this case, the opening portion formation region is the entire flange portion. Even in this case, portions of the flange portion located on both the sides of the opening portion in the second circumferential direction are connected by the circumferential wall portion of the resin cover. Therefore, the above effects are achieved.

Further, a recessed portion continuous with the opening portion 63 may be formed in the circumferential wall portion 61 of the resin cover 60. Hereinafter, a modification in which the recessed portion is formed in the circumferential wall portion 61 will be described.

Figure 8:
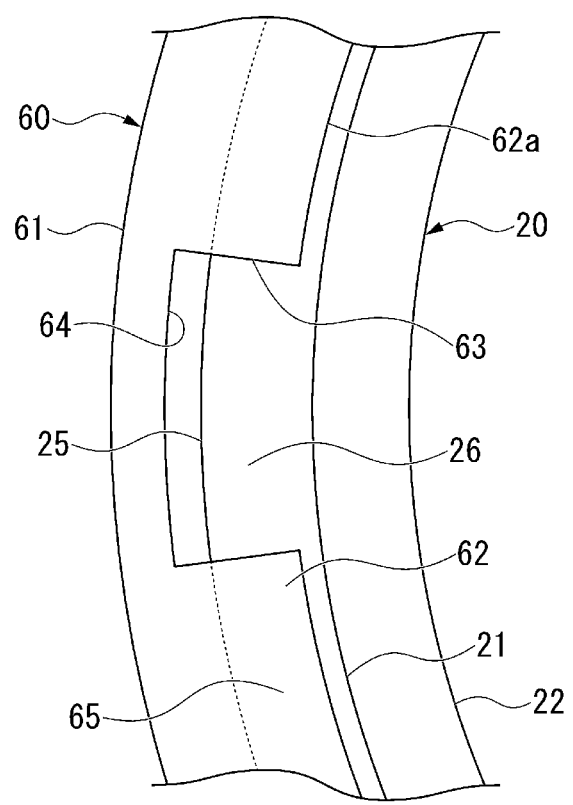
FIG. 8 is a plan view of the outer ring and the resin cover according to a first modification of the first embodiment, and is an enlarged view corresponding to FIG. 5.

FIG. 8 is a plan view of the outer ring and the resin cover according to a first modification of the first embodiment, and is an enlarged view corresponding to FIG. 5.

As shown in FIG. 8, a recessed portion 64 is formed in an end surface of the circumferential wall portion 61 of the resin cover 60 facing outward in the axial direction. The recessed portion 64 is continuous with the opening portion 63 on the inner side in the first radial direction. The recessed portion 64 is formed such that the opening portion 63 extends outward in the second radial direction. In the present modification, the recessed portion 64 has a gap in the first radial direction with respect to an outer circumferential surface of the circumferential wall portion 61. For example, a depth of the recessed portion 64 coincides with a depth of the opening portion 63.

According to the present modification, a similar effect as that of the first embodiment is achieved. Further, since the recessed portion 64 continuous with the opening portion 63 is formed on the end surface of the circumferential wall portion 61, the projection portion 125 provided on the base portion 120 of the fan motor 100 can be inserted from the opening portion 63 to the recessed portion 64. Therefore, the outer ring 20 can be more reliably restricted from rotating with respect to the base portion 120.

Figure 9:
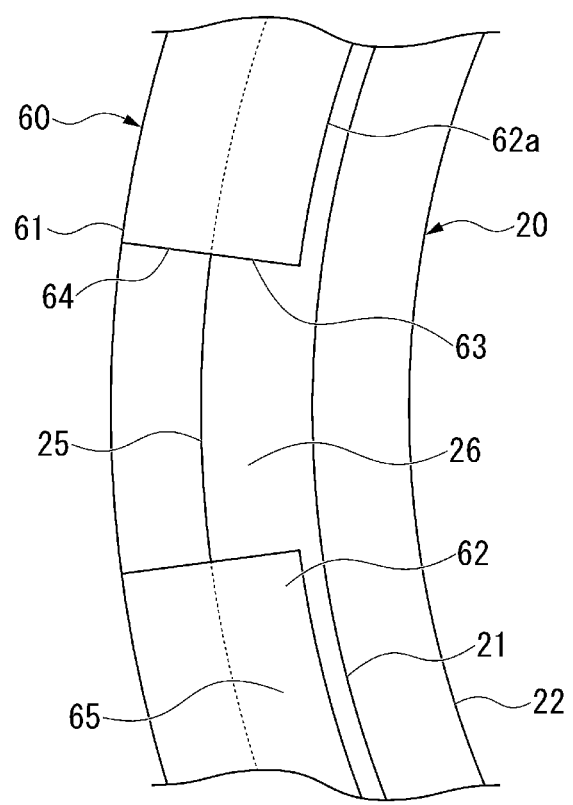
FIG. 9 is a plan view of the outer ring and the resin cover according to a second modification of the first embodiment, and is an enlarged view corresponding to FIG. 5.

FIG. 9 is a plan view of the outer ring and the resin cover according to a second modification of the first embodiment, and is an enlarged view corresponding to FIG. 5.

As shown in FIG. 9, the present modification is different from the first modification in that the recessed portion 64 opens across the end surface and the outer circumferential surface of the circumferential wall portion 61. With this configuration, a similar effect as that of the first modification is achieved.

Second Embodiment

Next, a second embodiment will be described with reference to FIG. 10. The second embodiment is different from the first embodiment in that opening portions 163 of a resin cover 160 does not open to an inner circumferential edge 162*a* of a flange portion 162. Configurations other than those to be described below are similar to those of the first embodiment.

Figure 10:
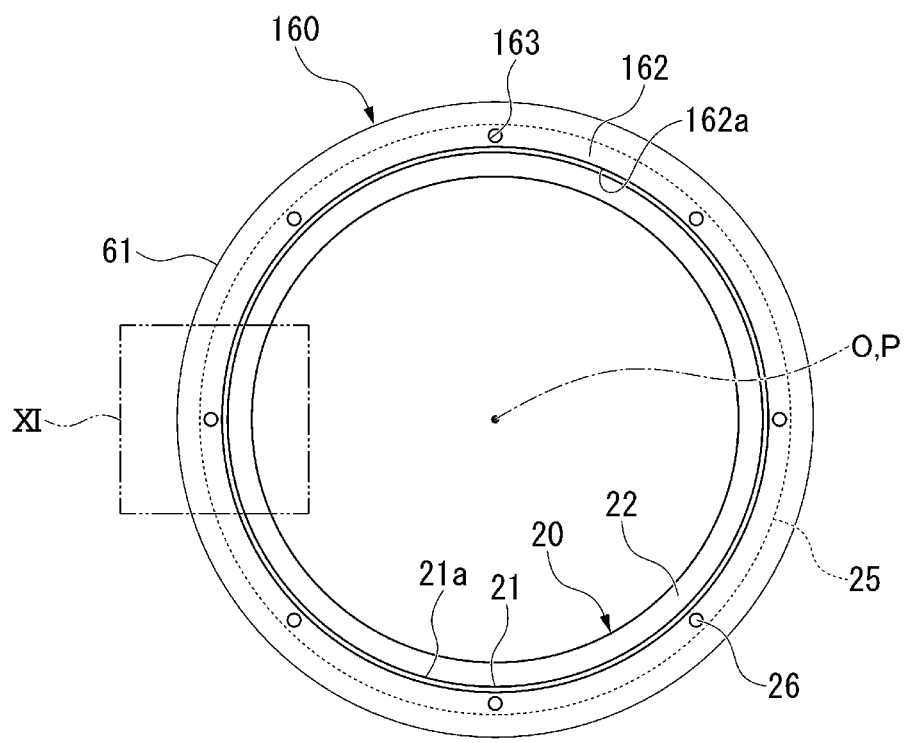
FIG. 10 is a plan view of an outer ring and a resin cover according to a second embodiment.

FIG. 10 is a plan view of the outer ring and the resin cover according to the second embodiment.

As shown in FIG. 10, the flange portion 162 has the opening portions 163 instead of the opening portions 63 in the first embodiment. The opening portion 163 has a circular shape when viewed in the axial direction. The shape of the opening portion 163 is not particularly limited. The opening portion 163 penetrates the flange portion 162 in the axial direction to expose the end surface 26 of the outer ring 20. The opening portions 163 are all located inside an outer circumferential edge of the flange portion 162 and outside the inner circumferential edge 162*a* of the flange portion 162.

Figure 11:
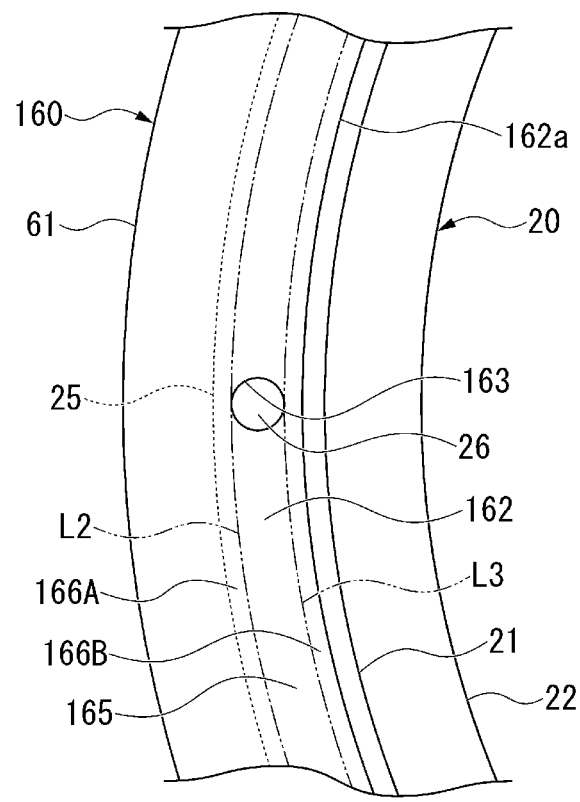
FIG. 11 is an enlarged view of a portion XI in FIG. 10.

FIG. 11 is an enlarged view of a portion XI in FIG. 10.

As shown in FIG. 11, the flange portion 162 includes an opening portion formation region 165, an outer circumferential covering region 166A, and an inner circumferential covering region 166B. The opening portion formation region 165 is defined similarly to the opening portion formation region 65 in the first embodiment. In the present embodiment, an inner circumferential edge of the opening portion formation region 165 is in contact with all the opening portions 163 from the inner side in the second radial direction, and is positioned outside the inner circumferential edge 162*a* of the flange portion 162 in the second radial direction. That is, the opening portion formation region 165 is an annular region sandwiched between a circular arc-shaped imaginary line L2 and a circular arc-shaped imaginary line L3 shown in FIG. 11. A total area of the opening portions 163 is smaller than half an area of the opening portion formation region 165.

The outer circumferential covering region 166A is implemented similarly to the covering region 66 in the first embodiment. That is, the outer circumferential covering region 166A is an annular region sandwiched between the circular arc-shaped imaginary line L2 and the outer circumferential edge of the end surface 26 of the outer ring 20 shown in FIG. 11. The inner circumferential covering region 166B extends over an entire circumference in the second circumferential direction. The inner circumferential covering region 166B is located on an opposite side of the circumferential wall portion 61 in the second radial direction (that is, the inner side in the second radial direction) of the opening portion formation region 165, and is adjacent to the opening portion formation region 165 over the entire circumference. The entire inner circumferential covering region 166B covers the end surface 26 of the outer ring 20. The inner circumferential covering region 166B is defined in a range that covers the end surface 26 of the outer ring 20. Therefore, an outer circumferential edge of the inner circumferential covering region 166B coincides with the inner circumferential edge of the opening portion formation region 165, and an inner circumferential edge of the inner circumferential covering region 166B coincides with the inner circumferential edge 162*a* of the flange portion 162. That is, the inner circumferential covering region 166B is an annular region sandwiched between the circular arc-shaped imaginary line L3 and the inner circumferential edge 162*a* of the flange portion 162 shown in FIG. 11.

In the present embodiment, a similar effect as that of the first embodiment is achieved. In addition, in the present embodiment, the flange portion 162 has the inner circumferential covering region 166B adjacent to the opening portion formation region 165 on the opposite side of the circumferential wall portion 61 in the second radial direction. According to this configuration, portions of the flange portion 162 located on both sides of the opening portion 163 in the second circumferential direction are connected by both the outer circumferential covering region 166A and the inner circumferential covering region 166B. Therefore, strength of the opening portion formation region 165 of the flange portion 162 can be further improved.

In the second embodiment, the flange portion 162 has the outer circumferential covering region 166A, but the flange portion may not have the outer circumferential covering region. Even in this case, portions of the flange portion located on both the sides of the opening portion in the second circumferential direction are connected by both the inner circumferential covering region 166B and the circumferential wall portion of the flange portion. Therefore, the above effects are achieved.

Third Embodiment

Next, a third embodiment will be described with reference to FIG. 12. The third embodiment is different from the first embodiment in that a resin cover 260 is mounted on the inner ring 10. Configurations other than those to be described below are similar to those of the first embodiment.

Figure 12:
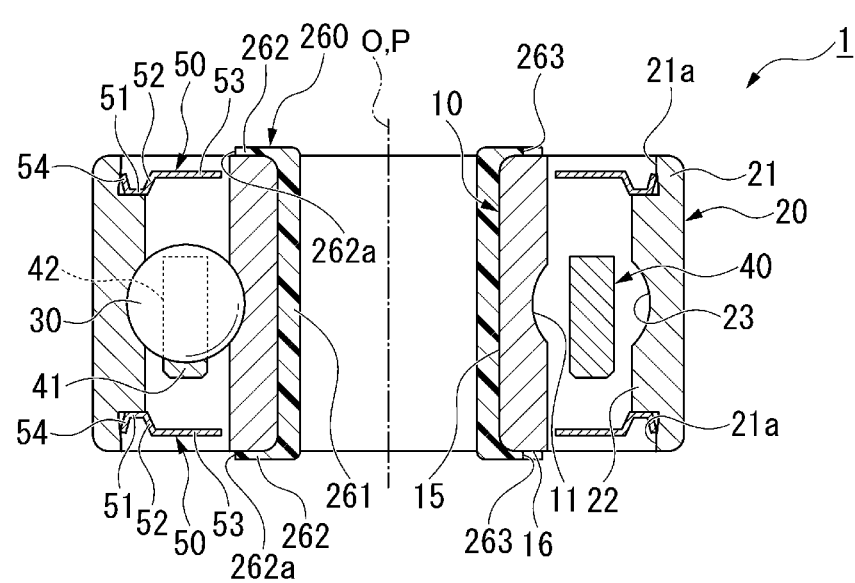
FIG. 12 is a longitudinal cross-sectional view of a rolling bearing according to a third embodiment.

FIG. 12 is a longitudinal cross-sectional view of a rolling bearing according to the third embodiment.

As shown in FIG. 12, the resin cover 260 includes a circumferential wall portion 261 covering the inner circumferential surface 15 of the inner ring 10 and a pair of flange portions 262 connected to the circumferential wall portion 261 and covering the end surface 16 of the inner ring 10. The circumferential wall portion 261 covers the entire inner circumferential surface 15 of the inner ring 10 from the inner side in the first radial direction. The circumferential wall portion 261 extends in the axial direction with a constant inner diameter. The pair of flange portions 262 are formed in the same shape as each other when viewed in the axial direction. The flange portion 262 protrudes outward in the first radial direction from an end portion of the circumferential wall portion 261 in the axial direction. The flange portion 262 extends around the central axis O over an entire circumference. The flange portion 262 is a portion extending outward in the first radial direction from a position overlapping an inner circumferential edge of the end surface 16 of the inner ring 10 when viewed in the axial direction.

An outer circumferential edge 262a of the flange portion 262 has a circular shape centered on the axis P extending in the axial direction. Opening portions 263 are formed in the flange portion 262. The plurality of opening portions 263 are provided at equal intervals in the second circumferential direction. All the opening portions 263 are formed in the same shape. The opening portion 263 penetrates the flange portion 262 in the axial direction to expose the end surface 16 of the inner ring 10. The opening portion 263 opens to the outer circumferential edge 262a of the flange portion 262 and is open to the outer side in the second radial direction. The entire opening portion 263 is located outside an inner circumferential edge of the flange portion 262. Accordingly, the flange portion 262 includes an opening portion formation region and a covering region, similar to the flange portion 62 in the first embodiment. As described above, in the present embodiment, a similar effect as that of the first embodiment is achieved.

The invention is not limited to the embodiments described above with reference to the drawings, and various modifications are conceivable within the technical scope of the invention.

For example, although the fan motor is illustrated as the rotating device in the above embodiments, the rotating device is not limited thereto. For example, the invention may be applied to a dental handpiece, a spindle motor of a hard disk drive, and the like as the rotating device. In the above embodiments, the inner ring 10 is provided as a rotating ring, and the outer ring 20 is provided as a fixed ring. Alternatively, the inner ring may be provided as a fixed ring, and the outer ring may be provided as a rotating ring.

In the above embodiments, the pair of flange portions 62 are formed in the same shape as each other when viewed in the axial direction, but there is no limitation to this configuration. For example, the opening portion may be formed in only one of the flange portions.

Although the first radial direction and the second radial direction are distinguished from each other in the above embodiments, the first radial direction and the second radial direction may be regarded as the same direction because eccentricity ratios of the central axis O and the axis P are substantially minute. The same applies to the first circumferential direction and the second circumferential direction.

In addition, components in the above-described embodiments can be appropriately replaced with well-known components without departing from the gist of the invention, and the above-described embodiments and modifications may be appropriately combined.

What is claimed is:

1. A rolling bearing comprising:
   an inner ring and an outer ring that are disposed coaxially with each other;
   a rolling body that is disposed between the inner ring and the outer ring; and
   a resin cover that is mounted on one bearing ring of the inner ring and the outer ring, wherein the one bearing ring comprises:
      a circumferential surface that faces an opposite side of the other bearing ring of the inner ring and the outer ring; and
      an end surface that faces an axial direction,
   the resin cover comprises:
      a circumferential wall portion that covers the circumferential surface; and
      a flange portion that is connected to the circumferential wall portion and covers the end surface, wherein the flange portion has an opening portion formation region that has a constant width in a radial direction, extends over an entire circumference, and is formed with opening portions that expose the end surface.

2. The rolling bearing according to claim 1, wherein the flange portion further includes a covering region that is formed adjacent radially outside to the opening portion formation region, extends over an entire circumference, and entirely covers the end surface.

3. The rolling bearing according to claim 2, wherein the covering region is formed adjacent radially outside to the opening portion formation region on an opposite side of the circumferential wall portion in the radial direction.

4. The rolling bearing according to claim 1, wherein a total area of the opening portions is smaller than a half in area of the opening portion formation region.

5. The rolling bearing according to claim 1, wherein the opening portion is opened at a circumferential edge in the flange portion on an opposite side of the circumferential wall portion.

6. The rolling bearing according to claim 1, wherein the flange portion has a gap over an entire circumference with respect to a circumferential edge of the end surface on an opposite side of the circumferential surface when viewed in the axial direction.

7. The rolling bearing according to claim 1, wherein the opening portions are arranged at equal intervals in a circumferential direction.

8. The rolling bearing according to claim 1, wherein the flange portion includes:
  a first flange portion covering a first end surface of the one bearing ring; and
  a second flange portion covering a second end surface of the one bearing ring, wherein the first flange portion and the second flange portion are formed in the same shape as each other when viewed in the axial direction.

9. The rolling bearing according to claim 1, wherein the one bearing ring is mounted on a mounted member, and the opening portions are fitted into the mounted member in a relatively unrotatable manner.

10. A rotating device comprising:
  a rotating body disposed to be rotatable;
  a support body configured to rotatably support the rotating body; and
  the rolling bearing according to claim 1 interposed between the rotating body and the support body.

11. A method for manufacturing a rolling bearing in which a resin cover to be mounted on a bearing ring of the rolling bearing and configured to cover a circumferential surface and an end surface of the bearing ring is insert-molded integrally with the bearing ring, the method for manufacturing a rolling bearing comprising embedding the bearing ring in the resin cover using a mold, wherein the mold comprises:
  a core that holds the bearing ring alone; and
  an ejector sleeve having a plurality of pin portions abutted against the end surface in a circumferential direction.

\* \* \* \* \*